United States Patent
Westerman et al.

(10) Patent No.: US 7,197,718 B1
(45) Date of Patent: Mar. 27, 2007

(54) INTERACTIVE VIRTUAL AREA BROWSER FOR SELECTING AND RESCALING GRAPHICAL REPRESENTATIONS OF DISPLAYED DATA

(75) Inventors: Larry A. Westerman, Portland, OR (US); George R. Borden, IV, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/420,321

(22) Filed: Oct. 18, 1999

(51) Int. Cl.
*G06F 3/00* (2006.01)

(52) U.S. Cl. .................. 715/801; 715/800; 715/798; 345/660

(58) Field of Classification Search ............ 345/764, 345/781, 784–788, 798–801, 856, 857, 859, 345/864, 660, 661, 667, 670–672, 676, 682, 345/684; 715/798, 800–801
See application file for complete search history.

(56) References Cited

U.S. PATENT DOCUMENTS

| | | | |
|---|---|---|---|
| 4,148,073 A | 4/1979 | Slobodzian et al. | |
| 4,197,590 A | 4/1980 | Sukonick et al. | |
| RE31,200 E | 4/1983 | Sukonick et al. | |
| 4,417,239 A | 11/1983 | Demke et al. ............. | 345/856 |
| 4,446,526 A | 5/1984 | Iwanade | |
| 4,574,364 A | 3/1986 | Tabata et al. ............. | 345/798 |
| 4,608,656 A | 8/1986 | Tanaka et al. ............. | 701/212 |
| 4,774,572 A | 9/1988 | Kellar et al. | |
| 4,786,897 A * | 11/1988 | Takanashi et al. .......... | 345/799 |
| 4,790,028 A | 12/1988 | Ramage ..................... | 382/298 |
| 4,831,556 A | 5/1989 | Oono ........................ | 345/786 |
| 4,864,011 A | 9/1989 | Bussink et al. | |
| 4,893,258 A | 1/1990 | Sakuragi ..................... | 345/668 |
| 4,961,072 A | 10/1990 | Sekikawa ................... | 345/671 |
| 4,972,138 A | 11/1990 | Bush | |
| 5,001,697 A | 3/1991 | Torres ........................ | 707/542 |
| 5,039,937 A | 8/1991 | Mandt et al. ............. | 324/121 R |
| 5,051,927 A | 9/1991 | Tada et al. .................. | 345/418 |
| 5,138,700 A | 8/1992 | Kinashita | |
| 5,175,813 A | 12/1992 | Golding et al. ............ | 345/786 |
| 5,187,776 A | 2/1993 | Yanker ....................... | 345/800 |
| 5,204,944 A | 4/1993 | Wolberg et al. | |
| 5,208,588 A | 5/1993 | Nishiyama ................. | 345/590 |
| 5,218,459 A | 6/1993 | Parulski et al. | |
| 5,263,134 A * | 11/1993 | Paal et al. .................. | 345/684 |
| 5,289,168 A * | 2/1994 | Freeman ..................... | 345/672 |
| 5,333,247 A * | 7/1994 | Gest et al. .................. | 345/672 |
| 5,341,466 A | 8/1994 | Perlin et al. | |
| 5,347,628 A | 9/1994 | Brewer et al. ............. | 345/775 |
| 5,361,296 A | 11/1994 | Reyes et al. | |
| 5,375,199 A | 12/1994 | Harrow et al. ............. | 345/771 |

(Continued)

OTHER PUBLICATIONS

Microsoft Publisher 98 Screendumps (pp. 1-7; 1997).*

*Primary Examiner*—Sd D. Luu
(74) *Attorney, Agent, or Firm*—Chernoff, Vilhauer, McClung & Stenzel

(57) ABSTRACT

A computer implemented graphical user interface and data processing method is provided that facilitates manipulation of objects on a display by directly manipulating a graphic representation of an active area of data. The user can select an active region of a larger information area, reposition it relative to the information area, resize it and zoom in or out by directly manipulating the graphic representation of the active area.

6 Claims, 3 Drawing Sheets

U.S. PATENT DOCUMENTS

| | | | |
|---|---|---|---|
| 5,396,590 A * | 3/1995 | Kreegar | 345/163 |
| 5,485,174 A * | 1/1996 | Henshaw et al. | 345/684 |
| 5,491,781 A | 2/1996 | Gasperina | 345/786 |
| 5,517,537 A | 5/1996 | Greene et al. | |
| 5,528,385 A | 6/1996 | Manning | |
| 5,533,383 A | 7/1996 | Greene et al. | |
| 5,553,225 A | 9/1996 | Perry | 345/786 |
| 5,583,984 A | 12/1996 | Conrad et al. | |
| 5,604,509 A | 2/1997 | Moore et al. | |
| 5,623,588 A | 4/1997 | Gould | 345/787 |
| 5,623,591 A | 4/1997 | Cseri | |
| 5,680,562 A | 10/1997 | Conrad et al. | |
| 5,692,142 A | 11/1997 | Cracroft et al. | |
| 5,715,385 A | 2/1998 | Stearns et al. | |
| 5,729,338 A | 3/1998 | Houlberg et al. | |
| 5,754,161 A * | 5/1998 | Noguchi et al. | 345/684 |
| 5,754,348 A | 5/1998 | Soohoo | |
| 5,768,552 A | 6/1998 | Jacoby | |
| 5,782,547 A | 7/1998 | Machtig et al. | |
| 5,835,578 A | 11/1998 | Reyes et al. | |
| 5,838,315 A | 11/1998 | Craycroft et al. | |
| 5,839,000 A | 11/1998 | Davis, Jr. et al. | |
| 5,841,994 A | 11/1998 | Boesch et al. | |
| 6,057,840 A * | 5/2000 | Durrani et al. | 345/786 |
| 6,320,599 B1 * | 11/2001 | Sciammarella et al. | 345/667 |

* cited by examiner

INTERACTIVE VIRTUAL AREA BROWSER FOR SELECTING AND RESCALING GRAPHICAL REPRESENTATIONS OF DISPLAYED DATA

BACKGROUND OF THE INVENTION

The present invention relates to a user interface for a computer and, more particularly, to a graphical user interface that readily accommodates user interaction in selecting, scrolling, and resealing graphical representations of data displayed by a computer.

A graphical user interface (GUI) permits a computer user to communicate with application programs running on the computer by manipulating "objects" on a virtual desktop. An object on the desktop is a graphical representation of data in a file. All of the objects in a file which are potentially viewable by the user make up a virtual information area which is a topological representation of the data space viewable by the user. When the objects of a file are displayed at a particular scale, the physical area required to display the information area may exceed the physical size of the window of the computer's display through which the user can view the information area. In this case, the computer processes a subset of the data and renders a region of the virtual information area that fits the available window. The remainder of the information area is "located" outside the window and out of the user's view. To permit the user to view and work with all regions of interest in the virtual information area, the user interface includes a scrolling control that facilitates processing new subsets of data representing other regions of the information area for display in the window. Scrolling effectively repositions the virtual information area under the window. Typically, GUIs also include a zoom control which facilitates changing the scale of objects displayed in the window. Zooming "in" permits the user to examine details of an object which are not clearly visible when displayed at a certain scale. Zooming "out" facilitates more convenient examination of the relationship of larger objects. User interfaces may also permit the user to select a part of the displayed portion of the information area and then change the size of the selected region preparatory to taking some action involving the selected objects, such as zooming.

Heretofore, graphical user interfaces have required the user to differentiate between zooming, scrolling, and other interactions with the information area by making a global modal change in the interaction medium to accomplish each individual interaction. To scroll, the user typically moves a mouse controlled cursor to a scroll bar icon at an edge of the display area. The scroll bar may provide the user with a choice of actuating a scrolling control or dragging a scroll box to cause the computer to move the window horizontally or vertically over the information area. Selection of a different control (a menu followed by area selection or a zoom box) is required if the user wishes to zoom in or out. For graphics programs, such as computer aided design (CAD), where information areas are large and users frequently desire to display new regions of the information area and zoom in or out to examine details or relationships of objects, the frequent movement of the cursor between the displayed objects and the various interface controls can be awkward, time consuming, and frustrating.

Perry, METHOD AND APPARATUS FOR COMBINING A ZOOM FUNCTION IN SCROLL BAR SLIDES, U.S. Pat. No. 5,583,225; illustrates a user interface having scroll bars for horizontal and vertical movement of the display window relative to the information area. The scroll bar includes a scroll box which can be dragged by a mouse controlled cursor to move the window. The relative lengths of the scroll box and the scroll bar represent the relative proportions of the window and the information area. A zoom control is incorporated into the scroll bar. By selecting the zoom control with the cursor, the user can resize the scroll box and proportionally change the size of the window relative to the size of the information area. The effect of displaying a greater or lesser region of the information area is to magnify or minify the objects displayed in the window. While placing the zoom and scroll controls in close proximity reduces the required cursor movement, global modal changes through multiple controls are required to indirectly manipulate the window and its contents.

What is desired, therefore, is a computer implemented user interface permitting a user to define a graphic region of interest in a virtual information area and to change the scale of displayed objects. The user interface should also permit resizing and repositioning the selected region relative to the information area without the necessity of searching out and actuating remotely located controls to make global modal changes.

SUMMARY OF THE INVENTION

The present invention overcomes the aforementioned drawbacks of the prior art by providing, in a first aspect, a computer implemented graphical user interface that includes a manipulator enabling the alteration of a scale of an object displayed by a computer. A dimension of a graphic representation of an active region of data on the computer is altered when the dimension of the active area is approximately equal to a limit. The interface allows the user to zoom in or out of an on-screen graphic to examine details or relationships between larger objects by dragging a handle of an active area when the size of the active area graphic is at a preset maximum or minimum limit.

In a second aspect, the present invention provides a computer implemented graphical user interface that includes a manipulator enabling a user to alter a size of an active region of an information area on a computer. The alteration is performed by a first user selected interaction with a graphic representation of the active region and to alter the scale of an object displayed by the computer by a second user selected interaction with the graphic representation. By interaction of an on-screen manipulator with the graphic representation of an active region, the user can alter the size of the active region by dragging an edge of the graphic of the region with a first manipulator selection and cause the scale of objects displayed in the active region to change by continuing to drag with the manipulator after a second selection with the controls for the manipulator.

The present invention also provides a method of processing data on a computer that includes the steps of selecting an active region from a data area on the computer; representing the active region as a graphic on a display; altering the portion of the data area included in the active region by altering the size of the graphic between a plurality of limits by interaction of a cursor and the graphic; and altering the data included in the active region to change a scale of an object visible on the display by interaction of the cursor with the graphic having a size approximately equal to one of the limits. In an alternative method, the scale of displayed objects is changed by dragging the active area after a second user directed cursor selection.

The present invention also provides a computer implemented user interface and data processing method permitting a user to define a region of interest in a virtual information area and to directly manipulate the graphic representation of the selected region without making global modal changes with remotely located controls. Using the interface and method a computer user can easily and efficiently change the scale of displayed objects and resize and reposition the selected region relative to a larger information area.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
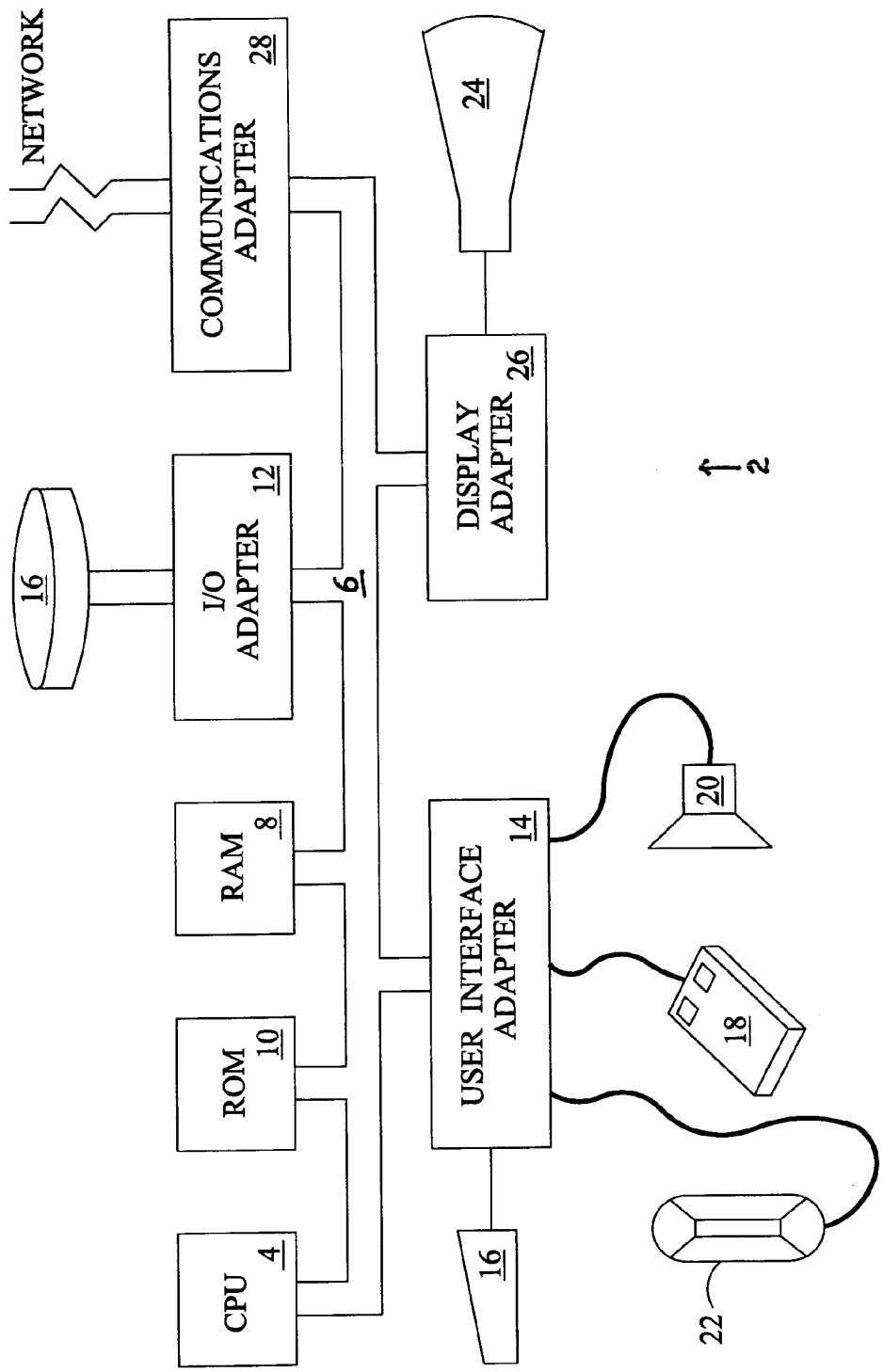
FIG. 1 is a block diagram of the hardware of an exemplary computer system.

FIG. 1 illustrates the hardware of a typical personal computer system 2 upon which the graphical user interface of the present invention might be implemented. The hardware includes a central processing unit (CPU) 4 which may be a microprocessor. The CPU 4 is attached to a system bus 6. Also attached to the system bus is random access memory (RAM) 8, read only memory (ROM) 10, an input/output (I/O) adapter 12, and a user interface adapter 14. The RAM 8 provides storage for application programs and data while the ROM 10 contains the basic input-output system (BIOS), including the boot code. The I/O adapter 12 is connected to one or more direct access devices including a disk drive 16 that provides mass storage for programs and data. The I/O adapter 14 may support one of several input-output device standards such as the Integrated Device Electronics (IDE) or Small Computer System Interface (SCSI) standards. The user interface adapter 14 provides the interface for a keyboard 16, mouse 18, speaker 20, microphone 22, or other input-output devices with which the user can interact with the computer system. A display 24 such as a cathode ray tube (CRT) or liquid crystal display (LCD) monitor is also connected to the system bus 6 through a display adapter 26. A communications adapter 28 may also be included to permit the computer to be connected to a computer network. The computer may, likewise, be any electronic device as for example, a handheld device.

Figure 2:
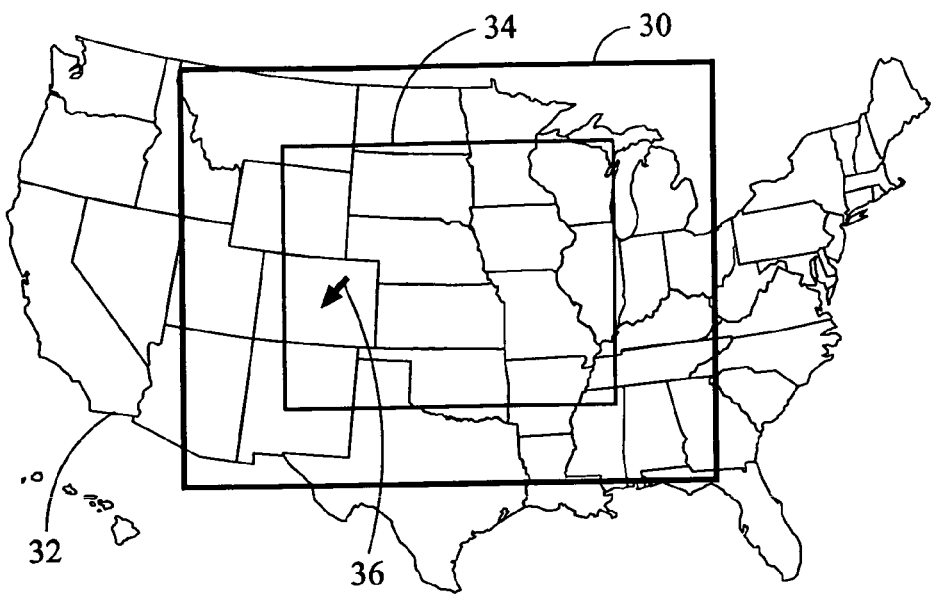
FIG. 2 illustrates an exemplary information area on a computer, a window for viewing the information area and an active region selected from the information area visible in the window.

A user interacts with the computer through programs running on the computer's hardware. User interaction may be facilitated by a graphical user interface (GUI) providing for a virtual desktop and permitting the user to communicate with the program by interaction with virtual controls and manipulation of graphical representations of the data in the files of the program or objects on the desktop. Referring to FIG. 2, a virtual desktop includes a window or "on-screen" display area 30 through which the user can view and manipulate objects in a virtual information area 32. One or more windows 30 may be simultaneously visible on the computer's display. The virtual information area 32 is the topological representation of a file's total data space potentially viewable by the user. At a particular level of magnification, the physical "area" occupied by the objects of the information area 32 may be greater than the physical dimensions of the window 30. For example, a particular file may contain the information area 32 describing a map, as illustrated in FIG. 2; a drawing, or text document which when viewed at a particular scale would occupy an area physically larger than the dimensions of the window 30. In other words, the data forming the image viewable in the window 30 is a subset of the total data making up the objects in the file or a region of the information area 32. Part of the information area is "located" off the display and out of view of the user.

To make effective use of the computer, the user should be able to move the window relative to the information area so that all regions of the virtual information area are visible and available for the object manipulation provided by the program. Movement of the window relative to the information area is accomplished by scrolling which effectively moves the information area under the window. Likewise, the user may wish to zoom in or out, effectively moving closer or further away from the information area, to view different levels of detail. Scrolling and zooming are actions which are often performed contemporaneously, but controlled by separate, remotely located controls making rapid switching between modes difficult and frustrating. The present inventors realized that it would be easier to use the computer if scrolling and zooming could be accomplished by directly altering the position and size of an active portion of the information area displayed in the window with a simple manipulator.

Continuing to refer to FIG. 2, in the GUI of the preferred embodiment of the present invention the user can select an active region 34 of the information area 32 displayed in the window 30 readying the objects within the active region for some additional operation. To select the active area 34 the cursor 36 is moved to a starting location in the window 30 by manipulating a mouse or other pointing device. With the cursor 36 at a starting location, the user can depress a mouse button or other selection control and drag the cursor 36 to a second location. The computer system displays a rectangle bounding the active region 34 with corners at the starting and second locations, as designated the user. Objects inside the active region 34 are selected for some operation. The active region may also be an existing "window" of the GUI which is selected for use in any manner.

Figure 3:
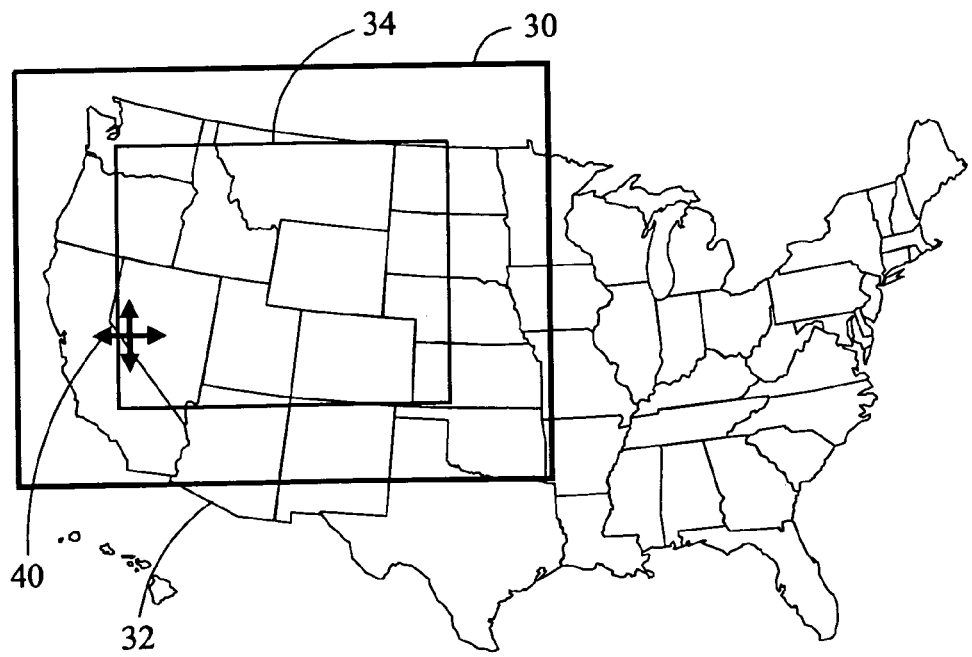
FIG. 3 illustrates an active region moved relative to the exemplary information area of FIG. 2.

To facilitate interaction with the data, the user may desire to move the active region 34 relative to the information area 32 so that a different region of the information area 32 is active and viewable in the window 30. Referring to FIG. 3, to do so, the user positions the cursor within the active area 34 and activates a control (e.g., depresses a mouse button). The cursor preferably changes shape to provide feedback to the user concerning the change in function. The user can then move the modified cursor or manipulator 40 to move the active area 34 relative to the information area 32.

Figure 4:
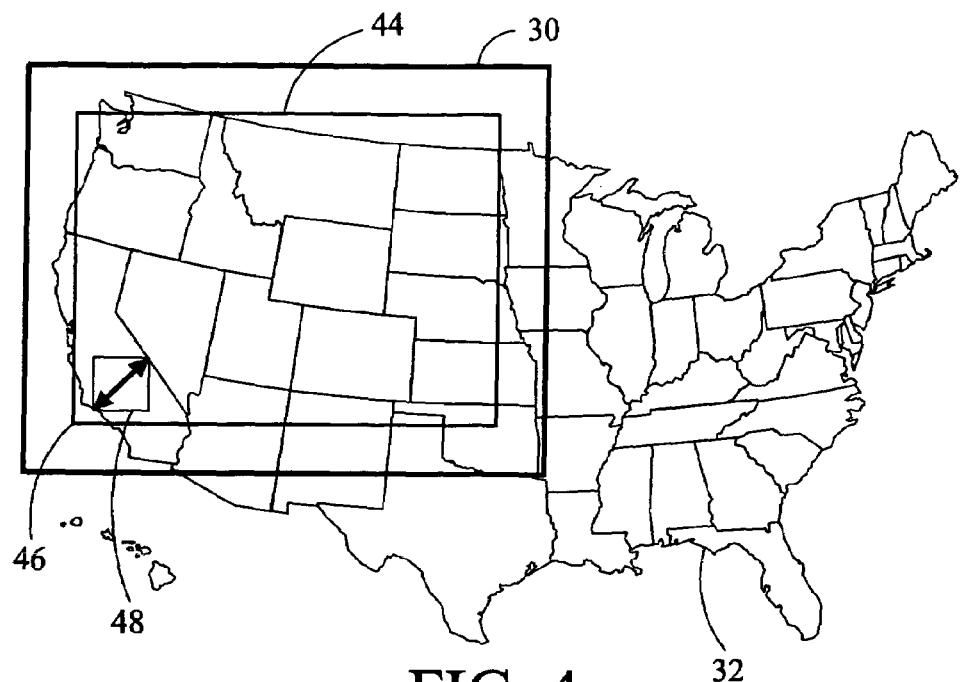
FIG. 4 illustrates a resized active region for the exemplary information area of FIG. 2.

The user may also desire to alter the size of the active area 34 to change the size of the region of the information area which is viewable in the window and the number of objects active for operations. To resize the active area, the cursor is positioned on the periphery of the active area 44 or at a "handle" 46 at the corner of the active area 44, as illustrated in FIG. 4. A cursor control, such as a mouse button, is used change modes causing the cursor to change shape providing user feedback concerning the change in function. The user can now change the size of the active area 44 by dragging the handle 46 or periphery with the manipulator 48. Changing the size of the active area, alters the quantity of data included in the subset of data being processed for some additional operation. Alternatively, the size of the active area 44 may be changed by handle located at other locations, as desired.

Figure 5:
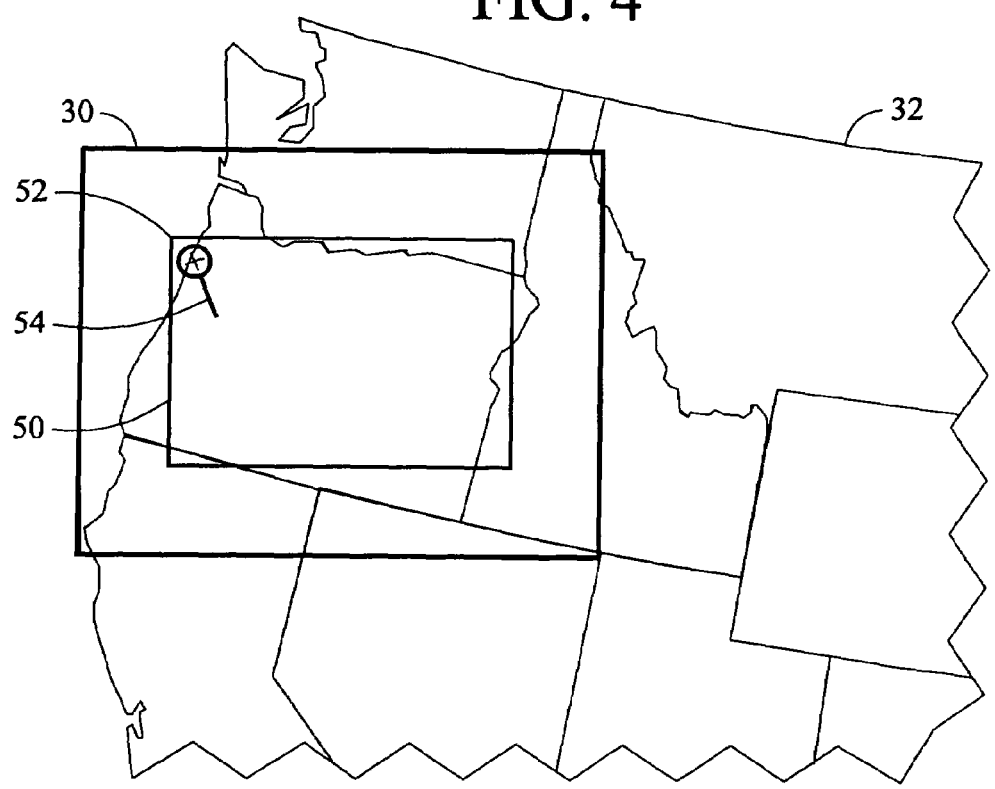
FIG. 5 illustrates rescaled objects in an active region of a section of the rescaled exemplary information area of FIG. 2.

Zooming in to magnify or zooming out minify the visible objects is an operation frequently desired in connection with movement of the display area relative to the information area. Functionally, zooming is related to changes in the size of the active area. When the size of the active region reaches the limits of the on-screen display, zooming is required to further increase or decrease the size of the active region. Referring to FIG. 5, the user interface of the present invention facilitates zooming of displayed objects by manipulating the graphic representation of the active area 50. With the cursor on a handle 52 at the corner of the active area 50, the user can switch to the zoom function by activating a second cursor control or by continuing to drag the handle 52 after the active area 50 has reached a preset maximum or minimum dimensional limit. Zooming, in effect, changes the scale of presentation of displayed objects. When the second cursor control is activated or the active area 50 has reached a size limit the cursor again preferably changes shape indicating the change of function. Further, movement of the manipulator 54 will cause the computer to process new subsets of the data from the information area causing the objects in the window 30 to be magnified ("zoom in") or minified ("zoom out").

In addition to the above described application to two-dimensional data presentation, the interface is useful for one-dimensional or three-dimensional graphic displays. For example, an active area on a ruler could be moved, resized, or rescaled (changing the gradations on the ruler) by application of the interface of the present invention. The interface allows a computer user to select a part of the available graphical representation of the virtual information area and directly manipulate the position, size and magnification applied to that area, avoiding the need to search for and select a number of controls to perform functionally related actions.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A computer implemented graphical user interface comprising:
    (a) a manipulator enabling alteration of a scale of an object displayed by a computer by altering a dimension of a graphic representation of an active region of a portion of data on said computer;
    (b) said dimension being equal to a limit;
    (c) wherein the size of said graphic representation is not changing while said scale is altering;
    (d) wherein said manipulator interacts directly with said graphic representation to enable said alteration;
    (e) wherein the size and the position of said graphic representation is changeable to display a graphic representation of an active region of another portion of said data;
    (f) wherein said size and said position of the graphic representation is changeable while both (1) the scale is not changing and (2) said interaction with said manipulator is not being said equal to said limit;
    (g) wherein when said size and said position of said graphic representation is changeable to reach said equal to said limit, upon said graphic representation reaching said equal to said limits said graphic representation does not change while said scale is said altering when said size and said position of said graphic representation is changed to a position beyond said equal to said limit.

2. The graphical user interface of claim 1 wherein alteration of said dimension of said graphic representation when said dimension is equal to a maximum causes said scale of said object to be minimized.

3. The graphical user interface of claim 1 wherein alteration of said dimension of said graphic representation when said dimension is equal to a minimum causes said scale of said object to be magnified.

4. The graphical user interface of claim 1 wherein said dimension of said graphic representation is a diagonal of a rectangle.

5. The graphical user interface of claim 1 wherein said computer on which said interface is implemented is a personal computer.

6. The graphical user interface of claim 1 wherein said computer on which said interface is implemented is a handheld electronic device.

* * * * *